United States Patent [19]

Takahashi

[11] 4,338,010

[45] Jul. 6, 1982

[54] FOCUSING SCREEN MOUNTING DEVICE

[75] Inventor: Norimichi Takahashi, Tokyo, Japan

[73] Assignee: Asahi Kogaku Kogyo Kabushiki Kaisha, Tokyo, Japan

[21] Appl. No.: 227,559

[22] Filed: Jan. 22, 1981

[30] Foreign Application Priority Data

Feb. 14, 1980 [JP] Japan .......................... 55-17483[U]

[51] Int. Cl.³ .................... G03B 13/00; G03B 19/12
[52] U.S. Cl. ..................................... 354/152; 354/200
[58] Field of Search ............... 354/152, 155, 219, 224, 354/225, 200, 201, 289, 53, 199

[56] References Cited

U.S. PATENT DOCUMENTS

| | | | |
|---|---|---|---|
| 2,135,963 | 11/1938 | Crumrine | 354/219 |
| 3,174,417 | 3/1965 | Sauer et al. | 354/155 |
| 4,132,472 | 1/1979 | Urano et al. | 354/155 |
| 4,187,016 | 2/1980 | Ishizaka | 354/152 |

FOREIGN PATENT DOCUMENTS 1208619 1/1966 Fed. Rep. of Germany ...... 354/155

*Primary Examiner*—Donald A. Griffin
*Attorney, Agent, or Firm*—Sughrue, Mion, Zinn, Macpeak and Seas

[57] ABSTRACT

A focusing screen mounting device for a camera which has a high stability and a minimum number of components to reduce the number of steps of adjustment needed during assembly. The focusing screen mounting device includes a focusing screen holder which is made of a flexible material and which is arched towards the focusing screen so as to urge the focusing screen towards the penta-prism of the camera. The focusing screen holder is hingedly mounted along a rear edge and is provided with upwardly-extending protrusions for securing the focusing screen.

5 Claims, 3 Drawing Figures

FIG. 1 PRIOR ART
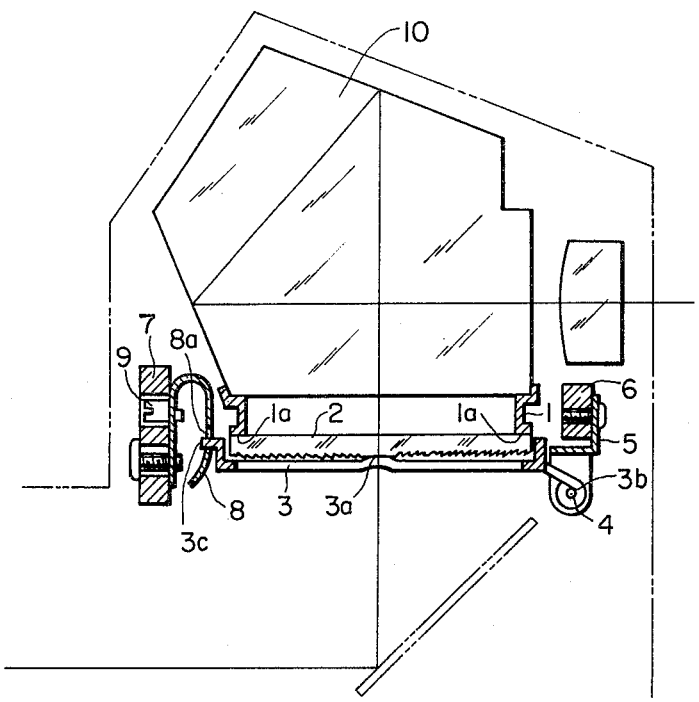
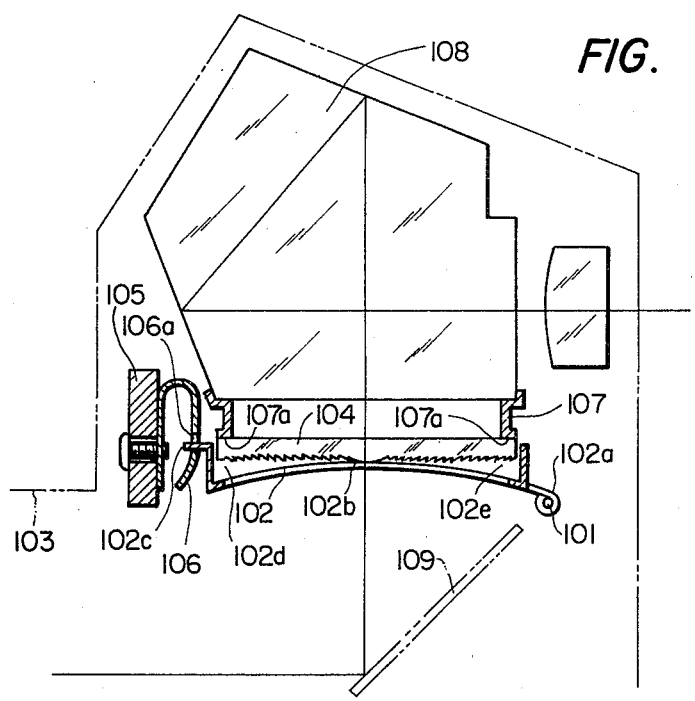

FOCUSING SCREEN MOUNTING DEVICE

BACKGROUND OF THE INVENTION

The present invention relates to a focusing screen mounting device for use in a single lens reflex camera.

In a camera which is so designed that the focusing screen below the penta-prism can be freely removed through the camera body mounting opening, when the focusing screen is inserted through the opening and set in place, it is always necessary that the focusing surface of the focusing screen be fixed at a position equivalent to that of the image plane on the film. In addition, the focusing screen must be stably mounted so that it cannot be displaced readily by shock or vibration. In the production line manufacture of cameras, the mounting surface, on the body side, of the focusing screen is liable to be affected by dimensional variations of related components and by the variations in assembly of the components. Accordingly, it is difficult to obtain a correct focusing position directly upon assembling the components. Therefore, during assembly of a camera, a so-called "focus adjustment" must generally be carried out by moving the focusing surface of the focusing screen vertically. In order to satisfy the above-described conditions, a number of components and a number of steps of adjustment are required for a conventional focusing screen mounting device.

A conventional focusing screen mounting device of the general type to which the invention pertains is shown in FIG. 1. A focusing screen holder 3 is arranged to allow a focusing screen 2 to abut against the lower surface 1a of a focusing screen supporting frame 1. A leaf spring 5 is secured to a mirror box rear part 6 by a shaft 4 at the rear end portion 3b of the focusing screen holder 3 to ensure that the focusing screen 2 is pushed up by the abutting portion 3a of the focusing screen holder 3. The front end portion 3c of the focusing screen holder 3 is engaged with a cut 8a formed in a stop 8 which is fixedly secured to a mirror box front part 7 to set the focusing screen 2 in place. If the front end portion 3c is disengaged from the stop 8, the focusing screen holder 3 is forced to swing down around the shaft 4 whereby the focusing screen 2 can be removed in the conventional manner.

The focusing screen supporting frame 1 is movable up and down to set the focusing screen 2 at the correct position. However, in the conventional focusing screen mounting device, the leaf spring 5 for pushing up the focusing screen 2 is provided only on one side, and accordingly the focusing screen holder 3 must be made turnable around its front end 3c which is fixed as a result of which a portion other than the abutting portion 3a of the focusing screen holder 3 is brought into contact with the focusing screen 2. That is, the focusing screen 2 is unstably depressed by the focusing screen holder 3.

In order to correct this unstable state, a step of moving the stop 8 vertically with an eccentric dowel 9 or the like is included in the assembling process. This step can be eliminated by making the stop 8 elastic vertically although the number of components is thereby increased, and accordingly not only the cumulative error but also the manufacturing cost is increased. Thus, the latter technique is considered not suitable.

In view of the foregoing, an object of the invention is to provide a focusing screen mounting device having higher stability than the previously-known devices of this type.

SUMMARY OF THE INVENTION

This and other objects of the invention are attained by a focusing screen mounting device having a focusing screen holder which performs a plurality of functions to thereby minimize the number of necessary components and to thereby reduce the number of steps of adjustment needed for assembly and to decrease the cumulative error during assembly.

More specifically, in accordance with the invention, there is provided a focusing screen mounting device for a camera for positioning a focusing screen below a penta-prism including a focusing screen holder rotatably mounted at a rear edge thereof with the focusing screen member being arched or curved upward towards the focusing screen and is flexible so as to urge the focusing screen towards the penta-prism. The focusing screen holder is provided with a locking member, which may be a protrusion formed at the front edge of the focusing screen holder lying in the same plane as the surface of the holder, so as to hold the focusing screen holder in a desired position. First through fourth protrusions are formed around the edges of the focusing screen holder so as to stably hold the focusing screen.

BRIEF DESCRIPTION OF THE DRAWINGS

FIG. 1 is a sectional view of a conventional focusing screen mounting device in which a focusing screen below a pentaprism can be freely removed through a camera body mounting opening;

FIG. 2 is a sectional view of a focusing screen mounting device according to the invention.

DESCRIPTION OF THE PREFERRED EMBODIMENTS

Figure 3:
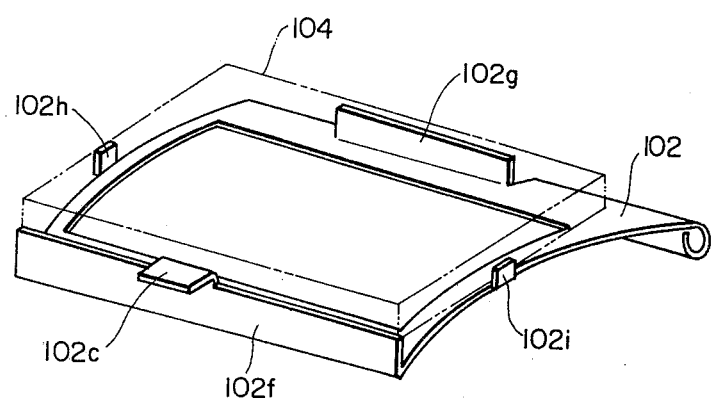
FIG. 3 is a perspective view of the focusing screen holder of FIG. 2.

The invention will be described with reference to a preferred embodiment shown in FIGS. 2 and 3.

FIGS. 2 and 3 are a sectional view and a perspective view, respectively, showing a focusing screen mounting device according to the invention. A focusing screen holder 102 is rotatably mounted on a shaft 101. The focusing screen holder 102 is arched, or curved, from its rear edge 102a toward a lens opening 103. More specifically, the focusing screen holder 102 is curved towards a focusing screen 104. The focusing screen holder 102 is flexible. An abutting portion 102b of the focusing screen holder 102 where the curved surface abuts against the focusing screen 104 is formed substantially at the center, in section, of the focusing screen 104. Accordingly, the focusing screen holder 102 is in contact with the focusing screen 104 at two positions, near protrusions 102h and 102i shown in FIG. 3. A front end protrusion 102c of the focusing screen holder 102 is engaged with a cut 106a formed in a stop 106 which is fixedly secured to a mirror box front portion 105 thereby to position the focusing screen 104. In FIG. 2, reference numerals 108 and 109 designate a penta-prism and a mirror, respectively.

In accordance with the invention, the function of the leaf spring 5 in FIG. 1 is provided by making the focusing screen holder 102 flexible in the direction of the viewfinder optical axis by suitably selecting the material and thickness thereof. Accordingly, the focus adjustment range obtained by moving a focusing screen supporting frame 107 vertically, together with the pentaprism 108, ranges from a position immediately before a gap is formed between the focusing screen 104 and the abutting portion 107a of the frame 107 as the upper limit until the spaces 102d and 102e between the focusing screen 104 and the focusing screen holder 102 are eliminated as the lower limit. In practice, the focus adjustment range should be determined with some margin.

With the arrangement described above, the focus adjustment can be achieved with the stop 106 and the shaft 101 maintained in completely fixed positions, and accordingly the abutting portion 102b of the focusing screen holder 102 is maintained in contact with the focusing screen stably.

FIG. 3 is a perspective view of the focusing screen holder 102. Four protrusions 102f, 102g, 102h and 102i extend from four sides of the focusing screen holder 102 substantially perpendicularly to the surface of the focusing screen holder 102 to prevent the focusing screen 104 from being displaced. The protrusions 102h and 102i on both (right and left) sides of the holder 102 should be shaped and dimensioned so that they do not greatly affect the flexibility of the focusing screen holder 102.

As is apparent from the above description, since the focusing screen holder itself is made flexible, the number of components is decreased thereby enhancing the stability of the device and reducing the number of steps of adjustment needed and thus greatly contributing to a reduction of the manufacturing cost of the device.

What is claimed is:

1. A focusing screen mounting device for a camera for positioning a focusing screen below a pentaprism comprising: a focusing screen holder secured with a hinge at a rear portion thereof, said focusing screen holder having a locking member at a front portion thereof, said focusing screen being replacable through a camera body mounting opening by releasing said locking member, and at least two entire sides of said focusing screen holder being flexible to urge said focusing screen towards said pentaprism.

2. A focusing screen mounting device for a camera comprising: a focusing screen holder, said focusing screen holder being arched from a rear edge towards a focusing screen, two entire sides of said focusing screen holder being flexible, and said focusing screen holder resiliently urging said focusing screen towards a pentaprism; means for rotatably mounting said focusing screen holder along said rear edge; and means for lockably holding a front edge of said focusing screen holder.

3. The focusing screen mounting device of claim 2 wherein said focusing screen holder has first and second protrusions, respectively, at opposite side edges thereof substantially at a maximum upwardly-extending position of said focusing screen holder.

4. The focusing screen mounting device of claim 3 wherein said focusing screen holder has a third protrusion at said rear edge and a fourth protrusion at a front edge thereof, said first, second, third and fourth protrusions extending substantially perpendicular to the surface of said focusing screen holder for preventing said focusing screen from being displaced.

5. The focusing screen mounting device of claim 4 wherein said focusing screen holder has a fifth protrusion at said front edge extending substantially parallel to said surface of said focusing screen holder, said fifth protrusion being adapted to engage with a cut formed in a stop member for securing said focusing screen holder.

* * * * *